May 12, 1925.

O. H. PAXSON, JR., ET AL 1,537,492

FLUID LEVEL FEED CONTROL

Filed Nov. 24, 1922　　2 Sheets-Sheet 1

WITNESS:

INVENTORS
George F. Fenno and
Oliver H. Paxson, Jr.
BY
ATTORNEY

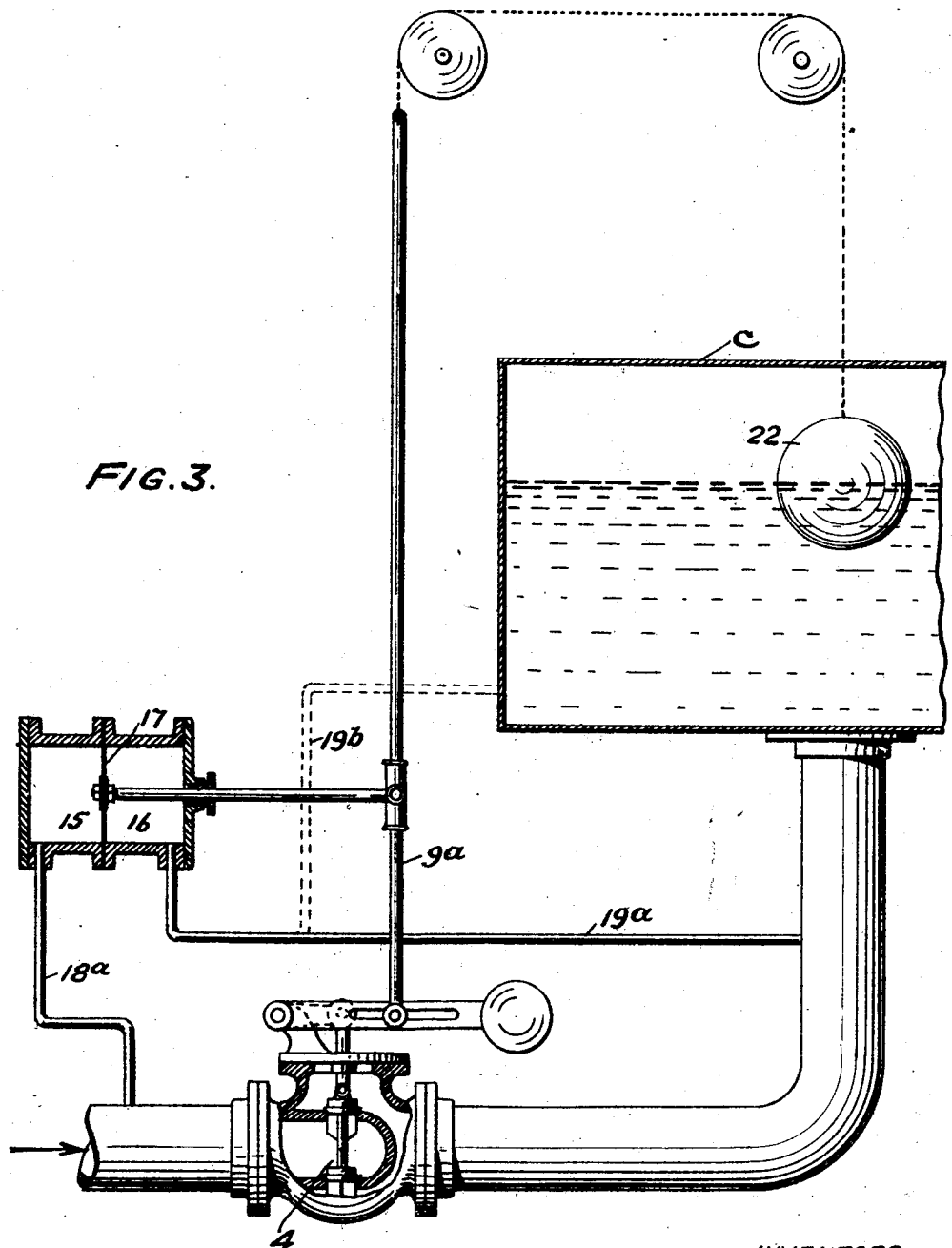

Patented May 12, 1925.

1,537,492

UNITED STATES PATENT OFFICE.

OLIVER H. PAXSON, JR., OF PHILADELPHIA, AND GEORGE F. FENNO, OF UPPER DARBY, PENNSYLVANIA.

FLUID-LEVEL-FEED CONTROL.

Application filed November 24, 1922. Serial No. 603,058.

*To all whom it may concern:*

Be it known that we, OLIVER H. PAXSON, Jr., and GEORGE F. FENNO, both citizens of the United States, residing, respectively, at Philadelphia, Philadelphia County, State of Pennsylvania, and at Upper Darby, Delaware County, State of Pennsylvania, have jointly invented a new and useful Improvement in Fluid-Level-Feed Controls, of which the following is a specification.

In the arts there are many instances in which a constant level of fluid is maintained by the automatic operation of a fluid feed control valve, but variations in fluid pressure on either side of the valve results in departure from the constant level sought to be maintained. The reason for this is that the rate of flow through an opening varies with changes of pressure on either side of the opening. The size of the opening will determine the rate of flow for constant difference in pressure but a change in the difference in pressure will change the rate of flow, other things being the same, or regarded as negligible for the sake of this explanation. Regulating boiler feed water is one example and in that art each boiler is frequently fitted with a fluid feed valve responsive to level in the boiler, but since the boilers are connected to a common pipe header, it is evident that the pressure in different parts of the header and consequently on the inlet side of the valves of some of the boilers will vary and in that way the automatic regulation of the level in those boilers is disturbed.

The principal objects of the present invention are, first, to provide for maintaining a more nearly constant fluid level than was heretofore accomplished by automatic regulators; and second, to automatically compensate for changes in pressure across a single valve automatically operated to maintain a constant fluid level.

To these and other ends hereinafter set forth the invention, generally stated, comprises fluid level feed control comprising the combination with a fluid feed valve subject to varying pressures, of two sets of co-operating means for actuating said valve of which one set is responsive to departures from the constant level which the valve is intended to insure and of which the other set is responsive to departures from the constant difference in pressure across the valve for which the apparatus is set. The invention also comprises the improvements to be presently described and finally claimed.

In the following description reference will be made to the accompanying drawings forming part hereof and in which are illustrated embodiments of the invention chosen from other embodiments.

In the drawings—

Fig. 3 is a view, partly in section, illustrating the invention in application to a tank through which fluid flows and in which it is desirable to maintain a constant fluid level.

Figure 1:
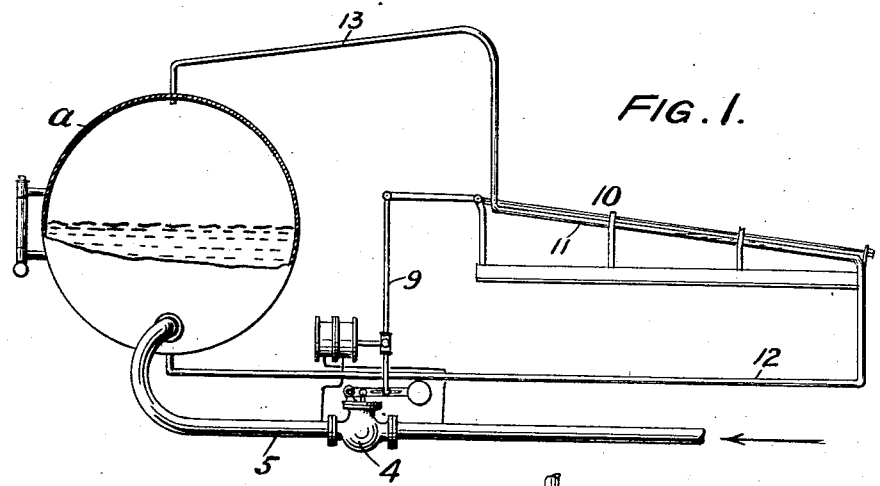
Figure 1 is a diagrammatic view, partly in section, illustrating the invention in application to regulating boiler feed water.
Figure 2:
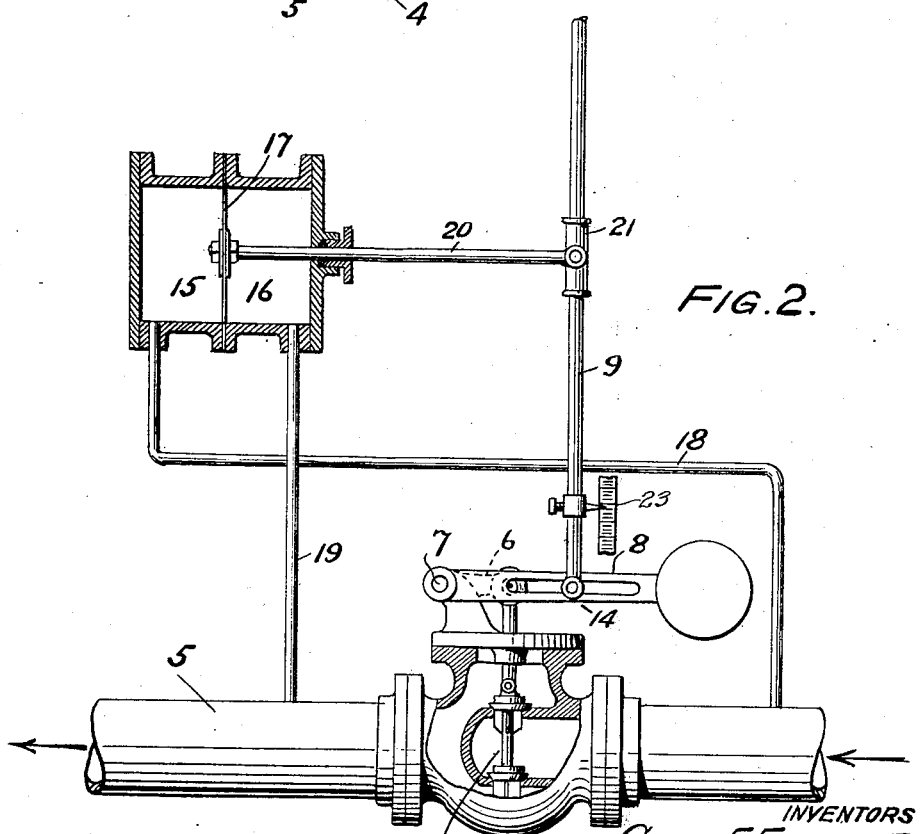
Fig. 2 is a view, partly in section and drawn to an enlarged scale, illustrating features of the invention shown in Figure 1,

Referring to Figs. 1 and 2, 4 is a control valve in the feed line 5. The inlet side of the valve is shown as on the right and the outlet side of the valve is shown as on the left. The feed line 5 leads to the boiler *a*. The valve 4 is attached to one arm of a lever 6 pivoted at 7, and the other arm 8 is connected by means of a rod 9 with a device generally indicated at 10 that forms no part of the invention. This device includes a tube 11 connected with the water space of the boiler as by a pipe 12 and with the steam space of the boiler as by a pipe 13. The tube 11 is adapted to expand and contract in response to departures in the water level in the boiler from the water level for which the device is set. In expanding and contracting the tube 11 operates to appropriately set the valve 4. All of this apparatus so far described or referred to is well understood and in itself forms no part of the invention. The rod 9 has slot-and-pin connection as at 14 with the weighted arm 8 that actuates the valve 4. The chambers 15 and 16 on opposite sides of the diaphragm 17 are connected respectively with the feed line on the high pressure side of the valve as by the connection 18, and with the pressure in the boiler as by the connection 19 which is shown as connected with the feed line on the low pressure side of the valve, and the pressure on this portion of the feed line is substantially the same as the boiler pressure because the drop in pressure in the short length of pipe between the valve and boiler is negligible. It may be said that the diaphragm 17 is responsive to departures from the constant difference in pressure at the inlet and outlet sides of the valve for which the apparatus is set. A departure from this difference in pressure causes the diaphragm to move toward the right or left, thus through the rod 20 and sleeve 21 shifting the point of connection of the rod 9 with the lever 8 toward or away from the pivot 7, and thus imparting opening or closing movement to the valve 4. It may be remarked that the movement of the lower end of the arm 9 in the embodiment of the invention illustrated is from the position shown in the drawings toward the right and back. The rod 9 is free to slide through the sleeve 21. The resilience of the diaphragm insures movement of the same under the influence of departure from the difference in pressure across the valve 4 for which the apparatus is set.

In use the apparatus 10 functions in a manner well understood by turning the lever 8 to open and close the valve 4 in order to maintain a constant water level in the boiler. In the drawings the valve is shown in closed position. In practice the fluid pressure varies across the valve 4 and although the valve 4 might be properly set by the apparatus 10, such variation in pressure would result in increased or diminished flow through the valve and prevent or interfere with the maintenance of a constant fluid level in the boiler. However, since the diaphragm 17 is responsive to departures from a constant difference in pressure across the valve, it operates when the valve is open to shift the point of connection of the rod 9 and arm 8 toward or away from the point 7, increasing or decreasing the opening through the valve 4 and insuring the maintenance of constant fluid level in the boiler.

The construction and mode of operation of the apparatus illustrated in Fig. 3 are as has been described except that the rod 9$^a$ is connected with a float 22 which rises and falls with the fluid level in the tank $c$, through which fluid is passing and in which the level is to be maintained constant. The chamber 15 is connected by a connection 18$^a$ with the inlet, i. e. lefthand, side of the valve, and the chamber 16 is connected by a connection 19$^a$ with the outlet side of the valve or, as indicated by dotted lines 19$^b$, with the tank $c$. In this case the rod 9$^a$ is moved up and down by the float 22 to open and close the valve 4, and the rod 9$^a$ is moved sidewise by the diaphragm to open and close the valve. It is an advantage of the described combination of fluid level and pressure control that the position of some part of the device, for example, the vertical position of the pin 14, indicates the rate of flow, therefore an indicator or recorder 23, Fig. 2, can be attached to such point.

It will be obvious to those skilled in the art to which the invention relates that modifications may be made in details of construction and arrangement without departing from the spirit of the invention which is not limited as to those matters or otherwise than as the prior art and the appended claims may require.

We claim:

1. A fluid level feed control comprising the combination with a fluid feed control valve subject to varying fluid pressure, of two sets of co-operating means for actuating said valve of which one set is responsive to departures from the constant level which the valve is intended to insure and of which the other set is responsive to departures from the constant difference in fluid pressure across the valve for which the apparatus is set.

2. Fluid level feed control comprising a single valve in combination with means responsive to changes in feed line pressure on the inlet side of the valve and to changes in fluid level and adapted to impart opening and closing movements to said valve.

3. Fluid level feed control comprising in combination a boiler having a feed line, a control valve in the feed line, means responsive to changes in fluid level in the boiler and adapted to open and close said valve to correct such changes and maintain constant level, and mechanism responsive to changes from a constant difference in pressure across the valve and adapted to open and close the valve to correct such changes.

4. Fluid level feed control comprising a valve having a pivotal lever for opening and closing it, a rod having sliding connection with the lever, means responsive to departures from constant fluid level for shifting the rod endwise, and means responsive to departures from constant pressure at the valve for shifting the rod in respect to the pivot of the lever.

5. Fluid level feed control comprising a feed line subject to varying pressure, a boiler feed water regulator responsive to water level, mechanism actuated by pressure changes in said feed line, and means for providing graduated flow area in said line and operatively connected with said regulator and with said mechanism.

6. A fluid level feed control comprising the combination with a fluid feed control valve subject to varying fluid pressure, of two sets of co-operating means for actuating said valve of which one set is responsive to departures from the constant level which the valve is intended to insure and of which the other set is responsive to departures from the constant difference in fluid pressure across the valve for which the apparatus is set, an element of said means being adapted to indicate the rate of flow.

OLIVER H. PAXSON, Jr.
GEO. F. FENNO.